United States Patent [19]

Nesheiwat

[11] Patent Number: 5,053,486

[45] Date of Patent: Oct. 1, 1991

[54] PROCESS FOR PREPARING POLY(ARYLENE SULFIDE SULFONE) WITH CONTROLLED RATIO OF ALKALI METAL CARBOXYLATE TO SULFUR SOURCE

[75] Inventor: Afif M. Nesheiwat, Charham, N.J.

[73] Assignee: Phillips Petroleum Company, Bartlesville, Okla.

[21] Appl. No.: 432,693

[22] Filed: Nov. 6, 1989

[51] Int. Cl.$^5$ .............................................. C08G 75/16
[52] U.S. Cl. ..................................... 528/388; 528/387
[58] Field of Search ................................ 528/388, 387

[56] References Cited

U.S. PATENT DOCUMENTS

| | | | |
|---|---|---|---|
| 3,919,177 | 11/1975 | Campbell | 260/79.1 |
| 4,016,145 | 4/1977 | Campbell | 260/79.3 M |
| 4,127,713 | 11/1978 | Campbell | 528/391 |
| 4,598,144 | 7/1986 | Ostlinning et al. | 528/388 |
| 4,774,276 | 9/1988 | Bobsein et al. | 524/399 |
| 4,808,698 | 2/1989 | Bobsein et al. | 528/388 |

*Primary Examiner*—Harold D. Anderson
*Attorney, Agent, or Firm*—Kenneth D. Goetz

[57] ABSTRACT

A process for preparing poly(arylene sulfide sulfone) by contacting a dihaloaromatic sulfone, an organic amide, a sulfur-containing compound, water, and an alkali metal carboxylate, wherein the molar ratio of the alkali metal carboxylate to the sulfur-containing compound is about 0.002:1 to less than 0.05:1.

13 Claims, 1 Drawing Sheet

PROCESS FOR PREPARING POLY(ARYLENE SULFIDE SULFONE) WITH CONTROLLED RATIO OF ALKALI METAL CARBOXYLATE TO SULFUR SOURCE

BACKGROUND OF THE INVENTION

This invention relates to the production of poly(arylene sulfide sulfone)s. In one aspect, this invention relates to the production of poly(phenylene sulfide sulfone). In another aspect, this invention relates to the production of poly(arylene sulfide sulfone)s exhibiting high molecular weight. In a further aspect, this invention relates to the production of poly(phenylene sulfide sulfone) exhibiting high molecular weight.

Poly(arylene sulfide sulfone)s are engineering thermoplastics of potential commercial interest for film, fiber, molding, and composite applications because of their high glass transition temperatures and chemical resistance.

General processes for the production of poly(arylene sulfide sulfone)s are known. Poly(arylene sulfide sulfone)s can be prepared by the reaction of a polyhalo aromatic sulfone, such as bis(4-chlorophenyl)sulfone, with an alkali metal sulfide in the presence of a polar organic compound.

U.S. Pat. No. 4,016,145 discloses the use of alkali metal carboxylate and U.S. Pat. No. 4,127,713 discloses the use of sodium carboxylate to increase the molecular weight of poly(arylene sulfide sulfone)s. Although these patents represent significant and valuable advances in the art, there is a need for a process which can provide high molecular weight poly(arylene sulfide sulfone)s without the problems associated with using higher levels of alkali metal carboxylate. Use of increased levels of alkali metal carboxylate results in increased production costs for poly(arylene sulfide sulfone) which is commercially undesirable. Furthermore, increased levels of alkali metal carboxylate can result in waste water disposal problems due to entrainment of organic acids. It has now been discovered that unexpectedly good results can be obtained using very low levels of alkali metal carboxylate in the production of poly(arylene sulfide sulfone)s.

SUMMARY OF THE INVENTION

It is an object of the invention to provide a process for producing high molecular weight poly(arylene sulfide sulfone) by using a low level of alkali metal carboxylate. It is a further object of the invention to provide a process for producing poly(arylene sulfide sulfone) with high recoverable yield by using a low level of alkali metal carboxylate.

According to the invention, a process for preparing poly(arylene sulfide sulfone)s is provided which comprises contacting at least one dihaloaromatic sulfone, at least one organic amide, at least one sulfur-containing compound, water, and at least one alkali metal carboxylate, wherein the molar ratio of the alkali metal carboxylate to the sulfur-containing compound is about 0.002:1 to less than 0.05:1.

DETAILED DESCRIPTION OF THE INVENTION

Figure 1:
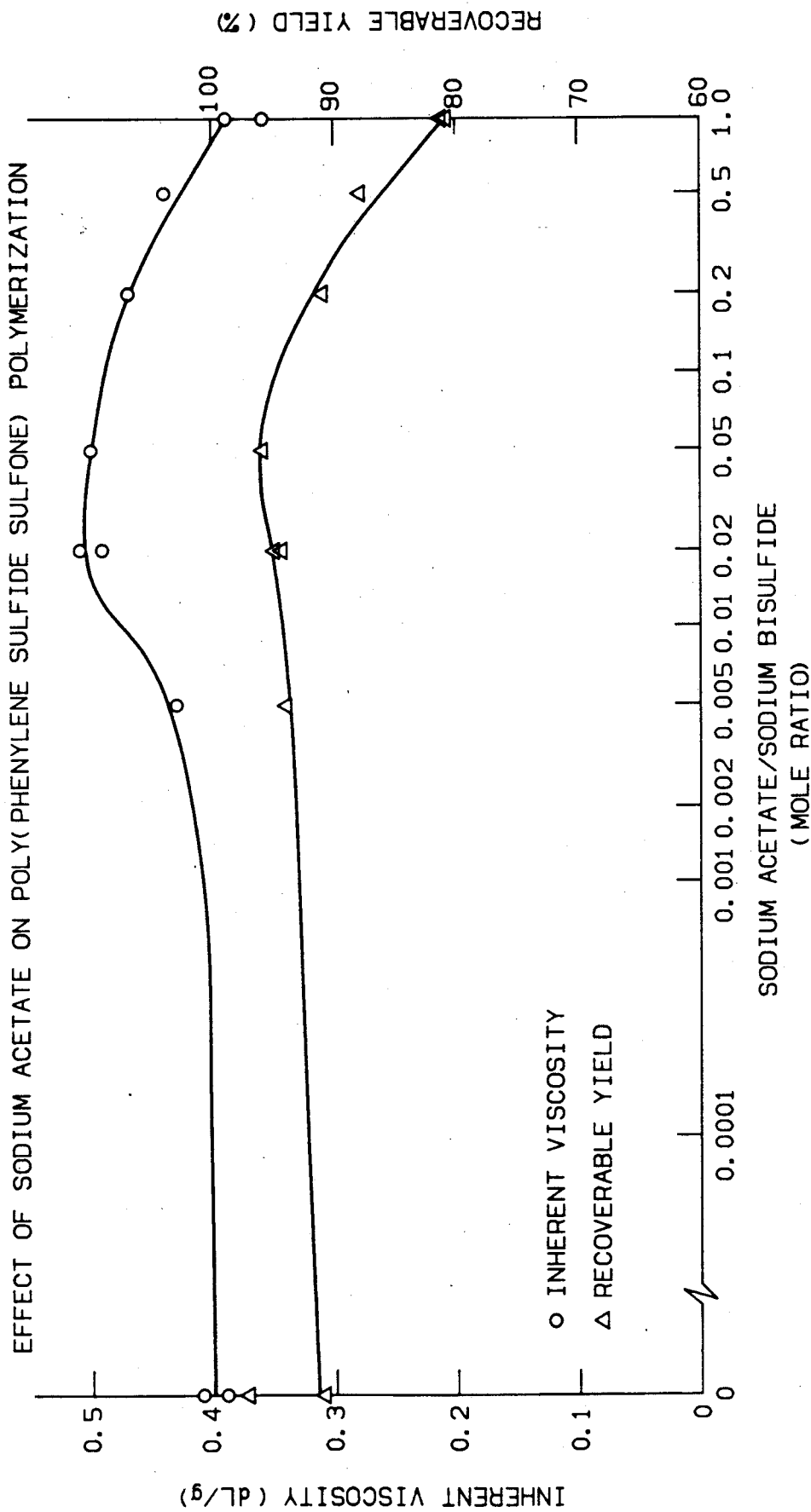
FIG. 1 is a plot demonstrating the effect of the level of sodium acetate on poly(phenylene sulfide sulfone) molecular weight and recoverable yield for polymerizations described in Example I.

This invention relates to a process for preparing poly(arylene sulfide sulfone) polymers comprising contacting: (a) at least one dihaloaromatic sulfone, (b) at least one organic amide, (c) at least one sulfur-containing compound, (d) water, and (e) at least one alkali metal carboxylate, wherein the molar ratio of the alkali metal carboxylate to the sulfur-containing compound is about 0.002:1 to less than 0.05:1. The high molecular weight poly(arylene sulfide sulfone)s made according to this invention are readily recoverable and well suited for use in applications such as film, fiber, molding, and composites.

Inherent viscosity is a measurement of molecular weight which is particularly useful in characterizing poly(arylene sulfide sulfone)s. As used herein, the term "inherent viscosity" (I.V.) refers to dilute solution viscosity which is the ratio of the natural logarithm of the relative viscosity to the polymer solution concentration in grams per deciliter. The relative viscosity is the ratio of the flow time of a specific solution of the polymer to the flow time of the pure solvent. Inherent viscosities for poly(arylene sulfide sulfone)s are measured generally according to the method described in ASTM D1243-79 wherein samples of dried polymer are dissolved in N-methyl-2-pyrrolidone at 30° C. at a polymer concentration of 0.5 grams per deciliter (g/dL) utilizing a No. 100 Cannon-Fenske viscometer.

Dihaloaromatic sulfones employed in the process of the invention can be represented by the formula

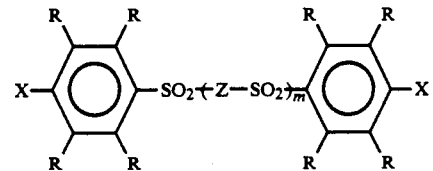

wherein each X is selected from the group consisting of fluorine, chlorine, bromine, and iodine, Z is a divalent radical selected from the group consisting of

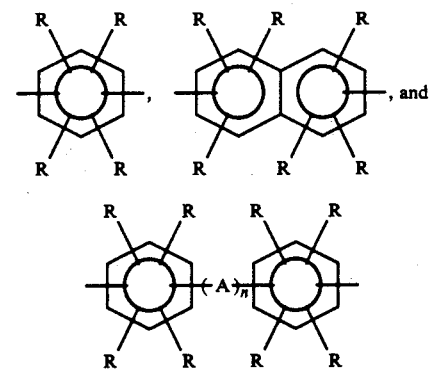

wherein m is 0 or 1, n is 0 or 1, A is selected from the group consisting of oxygen, sulfur, sulfonyl, and $CR_2$, wherein each R is selected from the group consisting of hydrogen and alkyl radicals having 1 to about 4 carbon atoms, the total number of carbon atoms in all of the R groups in the molecule being 0 to about 12. Preferably m is 0 and the dihaloaromatic sulfone of the invention is represented by the formula

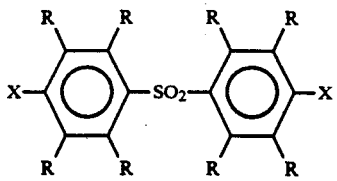

wherein each X is selected from the group consisting of fluorine, chlorine, bromine, and iodine, and each R is selected from the group consisting of hydrogen and alkyl radicals having 1 to about 4 carbon atoms, the total number of carbon atoms in all of the R groups in the molecule being 0 to about 12.

Examples of some dihaloaromatic sulfones that can be employed in the process of the invention include bis(4-fluorophenyl)sulfone, bis(4-chlorophenyl)sulfone, bis(4-bromophenyl)sulfone, bis(4-iodophenyl)sulfone, p-chlorophenyl p-bromophenylsulfone, p-iodophenyl 3-methyl-4-fluorophenylsulfone, bis(2-methyl-4-chlorophenyl)sulfone, bis(2,5-diethyl-4-bromophenyl)sulfone, bis(3-isopropyl-4-iodophenyl)sulfone, bis(2,5-dipropyl-4-chlorophenyl)sulfone, bis(2-butyl-4-fluorophenyl)sulfone, bis(2,3,5,6-tetramethyl-4-chlorophenyl)sulfone, 2-isobutyl-4-chlorophenyl 3-butyl-4-bromophenylsulfone, 1,4-bis(p-chlorophenylsulfonyl)benzene, 1-methyl-2,4-bis(p-fluorophenylsulfonyl)benzene, 2,6-bis(p-bromophenylsulfonyl)naphthalene, 7-ethyl-1,5-bis(p-iodophenylsulfonyl)naphthalene, 4,4'-bis(p-chlorophenylsulfonyl)biphenyl, bis[p-(p-bromophenylsulfonyl)phenyl]ether, bis[p-(p-chlorophenylsulfonyl)phenyl]sulfide, bis[p-(p-chlorophenylsulfonyl)phenyl]sulfone, bis[p-(p-bromophenylsulfonyl)phenyl]methane, 5,5-bis[3-ethyl-4-(p-chlorophenylsulfonyl)phenyl]nonane, and the like, and mixtures thereof. The presently preferred dihaloaromatic sulfone is bis(4-chlorophenyl)sulfone because of its effectiveness and commercial availability.

The amount of dihaloaromatic sulfone employed in the invention depends upon the amount of sulfur-containing compound employed. The amount of dihaloaromatic sulfone can be expressed in terms of a molar ratio of dihaloaromatic sulfone to sulfur-containing compound and will generally be about 0.7:1 to about 1.3:1. Preferably, this molar ratio is about 0.9:1 to about 1.15:1.

The organic amides used in the process of the invention should be substantially liquid at the reaction temperature and pressure employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N-ethyl-2-pyrrolidone, N-cyclohexyl-2-pyrrolidone, N-dodecyl-3-octyl-2-pyrrolidone, N,N'-ethylenedi-2-pyrrolidone, hexamethylphosphoramide, tetramethylurea, and the like and mixtures thereof.

The amount of organic amide employed according to the invention can be expressed in terms of molar ratio based on the sulfur-containing compound employed. Broadly, the molar ratio of organic amide to sulfur-containing compound will be about 2:1 to about 24:1, preferably about 4:1 to about 16:1. N-methyl-2-pyrrolidone is especially preferred because of excellent results and ready availability.

In accordance with the invention, suitable sulfur-containing compounds which can be employed in the production of the poly(arylene sulfide sulfone)s is selected from the group consisting of alkali metal sulfides, alkali metal bisulfides, and hydrogen sulfide. Suitable alkali metal sulfides include lithium sulfide, sodium sulfide, potassium sulfide, rubidium sulfide, and cesium sulfide, and mixtures thereof. The alkali metal sulfide can be used in anhydrous form, as a hydrate, or as an aqueous mixture. Sodium sulfide is preferred because of ready availability and good results obtained therewith. Suitable alkali metal bisulfides include lithium bisulfide, sodium bisulfide, potassium bisulfide, rubidium bisulfide, cesium bisulfide, and mixtures thereof. Sodium bisulfide is preferred because of ready availability and good results obtained therewith. The alkali metal bisulfide can conveniently be utilized in the process of the invention as an aqueous solution. For example, an aqueous solution of sodium bisulfide having about 60 weight percent sodium bisulfide is convenient to use.

The amount of water employed according to the invention can be expressed in terms of molar ratio based on the organic amide employed. Broadly, the molar ratio of organic amide to water will be from about 0.4:1 to about 1.6:1, preferably about 0.45:1 to about 1.3:1, and most preferably from about 0.5:1 to about 1:1.

Alkali metal carboxylates that can be employed in the process of the invention can be represented by the formula R'CO$_2$M where R' is a hydrocarbyl radical selected from alkyl, cycloalkyl, and aryl and combinations thereof such as alkaryl, aralkyl, and the like, the number of carbon atoms in said R' being within the range of 1 to about 20, and M is an alkali metal selected from lithium, sodium, potassium, rubidium, and cesium.

Examples of some alkali metal carboxylates that can be employed in the process of the invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyl tetradecanoate, sodium octadecanoate, sodium heneicosanoate, lithium cyclohexanecarboxylate, cesium cyclododecanecarboxylate, sodium 3-methyl cyclopentane carboxylate, potassium cyclohexylacetate, potassium benzoate, lithium benzoate, sodium benzoate, potassium m-toluate, lithium phenyl acetate, sodium 4-phenylcyclohexanecarboxylate, potassium p-tolylacetate, lithium 4-ethylcyclohexylacetate and the like and mixtures thereof. The presently preferred alkali metal carboxylate is sodium acetate because of its effectiveness and commercial availability.

The amount of alkali metal carboxylate employed according to the invention can be expressed in terms of molar ratio based on the sulfur-containing compound employed. Broadly, the molar ratio of alkali metal carboxylate to sulfur-containing compound will be from about 0.002:1 to less than 0.05:1, preferably about 0.005:1 to about 0.04:1, and most preferably about 0.01:1 to about 0.03:1.

In a preferred embodiment, a base selected from the group consisting of alkali metal hydroxide, alkali metal carbonate, and mixtures of at least one alkali metal hydroxide with at least one alkali metal carbonate is employed when the sulfur-containing compound is an alkali metal bisulfide or hydrogen sulfide.

Alkali metal hydroxides that can be employed according to the invention include lithium hydroxide, sodium hydroxide, potassium hydroxide, rubidiumhydroxide, cesium hydroxide, and mixtures thereof. Sodium hydroxide is preferred because of ready availability and good results obtained using this compound. The alkali metal hydroxide can conveniently be utilized in the process of the invention as an aqueous solution. For example, an aqueous solution of sodium hydroxide having about 50 weight percent sodium hydroxide is convenient to use.

Alkali metal carbonates that can be employed according to the invention include lithium carbonate, sodium carbonate, potassium carbonate, rubidium carbonate, cesium carbonate, and mixtures thereof. Sodium carbonate is preferred because of ready availability and generally good results obtained therewith.

If a mixture of at least one alkali metal hydroxide and at least one alkali metal carbonate is employed, said mixture should contain at least about 5 mole percent alkali metal carbonate. Preferably, said mixture will have about 20 to about 90 mole percent alkali metal carbonate and more preferably about 40 to about 80 mole percent alkali metal carbonate.

When a base is employed according to the preferred embodiment of the invention, the molar ratio of the base to the sulfur-containing compound is about 0.5:1 to about 4:1, preferably about 0.5:1 to about 2.05:1.

The charge sequence of the various compounds employed in the process of the invention can be varied as desired. One convenient method is to simply charge all the compounds in any desired sequence to a suitable reaction vessel equipped with agitation means at about room temperature and then to heat the mixture with stirring to the desired reaction temperature and to hold the mixture for the desired length of time at said temperature. It is also possible to preheat a mixture of only certain of the compounds in a separate vessel then to charge this mixture to the preheated mixture of the remainder of the compounds in the reaction vessel. For example, an organic amide can be prereacted with an alkali metal hydroxide in the presence of water, and this mixture subsequently contacted with the sulfur-containing compound to form a complex comprising these components. The complex is then utilized to contact at least one dihaloaromatic sulfone under suitable polymerization conditions to produce the poly(arylene sulfide sulfone). Although the reaction temperature at which the polymerization is conducted can vary over a considerable range, generally it will be within the range of about 140° C. to about 240° C., preferably about 185° C. to about 225° C. The reaction time can vary widely, depending in part on the reaction temperature employed, but generally will be within the range of about 10 minutes to about 72 hours, preferably about 1 hour to about 4 hours. The pressure should be sufficient to maintain the dihaloaromatic sulfone and other organic compounds present substantially in the liquid phase.

The poly(arylene sulfide sulfone)s as produced by the process of the invention are in particle form and can be separated from the reaction mixture by conventional procedures, e.g. by filtration of the reaction mixture to recover the polymer followed by washing at least once with water. A presently preferred recovery method involves diluting the hot reaction mixture with a mixture of water and organic amide and cooling the diluted mixture while stirring. The separated polymer particles can then be washed with water preferably with at least a portion of the washing being conducted at an elevated temperature within the range of about 130° C. to about 250° C. and then dried to provide a polymer which is low in ash-forming substances and is relatively light in color as well as exhibiting good melt flow stability under conditions of melt processing operations such as injection molding. In addition, it is presently preferred to employ a zinc carboxylate salt in the treatment of the recovered poly(arylene sulfide sulfone) in at least one of the above-described washing steps.

The poly(arylene sulfide sulfone)s produced by the process of the invention can be blended with fillers, fibers, pigments, extenders, other polymers and the like. The poly(arylene sulfide sulfone)s can be cured to provide cured products having high thermal stability and good chemical resistance, wherein curing is defined as a distinct process step after polymer drying comprising a thermal treatment on the polymer in the presence of an oxygen-containing atmosphere. The preferred oxygen-containing atmosphere is air. The poly(arylene sulfide sulfone)s of the invention are useful in the production of film, fibers, molded objects, and composites.

EXAMPLES

Example I

A series of polymerization runs were performed in a one gallon, fast stirring reactor for the preparation of poly(phenylene sulfide sulfone) (PPSS). The polymerization recipe for these runs is presented below.

|  | Compound, g-mole |
| --- | --- |
| Bis(4-chlorophenyl)sulfone (BCPS) | 1.0 |
| Sodium bisulfide (NaSH)[a] | 1.0 |
| Sodium hydroxide (NaOH) | 1.0 |
| N-methyl-2-pyrrolidone (NMP) | 8.0 |
| Water ($H_2O$)[b] | 3.0–5.0 |
| Sodium acetate (NaOAc) | 0.0–1.0 |

[a]Charged as a solid NaSH - $H_2O$ solution containing 59.9–60.2 weight percent NaSH.
[b]Does not include $H_2O$ present in NaSH.

In each run the reactor was charged with BCPS, NaSH, NaOH, NMP, $H_2O$ and optionally NaOAc. The reactor was sealed, agitation started and degassing accomplished by three pressurize-release cycles using nitrogen. The temperature of the reaction mixture was raised to 200° C. and held for 3 hours. At this time, heating was terminated and a mixture of 500 mL NMP and 175–210 mL $H_2O$ was charged to the reactor. The temperature of the reaction mixture dropped to 168°–184° C. upon addition of the NMP-$H_2O$ mixture. The reaction mixture was then cooled slowly.

The PPSS reaction mixture was separated using a No. 100 U.S.A. Sieve (150 microns). The material retained on the screen was washed with ambient distilled water and filtered three times. The final filter cake was then rinsed with acetone. The polymer was dried in a vacuum oven and weighed. Recoverable yield was calculated by dividing the weight of material retained on the screen by the weight of polymer produced assuming 100% conversion. A 60 gram sample of the washed polymer was charged to the reactor with 550 mL distilled $H_2O$. The reactor was sealed, agitation started and degassing accomplished by three pressurize-release cycles using nitrogen. The temperature of the slurry was raised to 180° C. and held for 30 minutes, then cooled. The reactor was opened, the liquid drawn off and the remaining p lymer washed twice in the reactor with ambient distilled H₂O and the liquid drawn off. To the reactor was added 550 mL distilled H₂O and 5-10 grams of zinc acetate. The reactor was sealed, agitation started and degassing accomplished by three pressurize-release cycles using nitrogen. The temperature of the slurry was raised to 180° C. and held for 30 minutes, then cooled. The reactor was opened, the slurry filtered and the polymer rinsed with acetone. The polymer was then dried in a vacuum oven, and a sample tested for inherent viscosity.

The results obtained are presented in Table I and plotted in FIG. 1.

TABLE I

| Run No. | NaOAc/NaSH, Mole Ratio | NMP/H₂O,$^{(a)}$ Mole Ratio | I.V.,$^{(b)}$ (dL/g) | Recoverable Yield, % |
|---------|------------------------|------------------------------|----------------------|----------------------|
| 1$^{(c)}$ | 0. | 1.13 | 0.39 | 91. |
| 2$^{(c)}$ | 0. | 1.13 | 0.41 | 97.4 |
| 3$^{(c)}$ | 1. | 1.57 | 0.39 | 81. |
| 4$^{(c)}$ | 1. | 1.57 | 0.36 | 81.2 |
| 5$^{(c)}$ | 0.5 | 1.13 | 0.44 | 88. |
| 6$^{(c)}$ | 0.2 | 1.13 | 0.47 | 91.2 |
| 7$^{(c)}$ | 0.05 | 1.13 | 0.50 | 96.2 |
| 8 | 0.02 | 1.13 | 0.51 | 94.5 |
| 9 | 0.02 | 1.13 | 0.49 | 95.0 |
| 10 | 0.005 | 1.13 | 0.43 | 94.1 |

$^{(a)}$Includes H₂O present in NaSH.
$^{(b)}$Inherent viscosity.
$^{(c)}$Comparative run.

The results in Table I and FIG. 1 indicate that PPSS having high molecular weight, as measured by inherent viscosity, and high recoverable yield can be obtained using a NaOAc/NaSH mole ratio of about 0.002:1 to less than 0.05:1 (Runs 8-10).

Runs 8-10 have higher inherent viscosities and recoverable yields than Runs 1 and 2 which have a NaOAc/NaSH mole ratio of 0:1, and Runs 3 and 4, which have a typical NaOAc/NaSH mole ratio of 1:1. It is unclear why the recoverable yield of Run 2 was significantly higher than that of Run 1. In addition, although the inherent viscosities of Runs 3 and 4 may be expected to be slightly higher with a lower NMP/H₂O mole ratio, the change would not be expected to change the trend shown in FIG. 1 significantly.

Therefore, the results indicate that unexpectedly good results can be obtained using extremely low levels of alkali metal carboxylate in the polymerization of poly(arylene sulfide sulfone). Use of such low levels of alkali metal carboxylate improves economics and reduces potential disposal problems.

That which is claimed is:

1. A process for the production of poly(arylene sulfide sulfone) comprising contacting:
   (a) at least one dihaloaromatic sulfone,
   (b) at least one organic amide,
   (c) at least one sulfur-containing compound,
   (d) water, and
   (e) at least one alkali metal carboxylate, wherein the molar ratio of said alkali metal carboxylate to said sulfur-containing compound is about 0.01:1 to about 0.03:1.

2. A process according to claim 1 wherein the molar ratio of said dihaloaromatic sulfone to said sulfur-containing compound is about 0.7:1 to about 1.3:1.

3. A process according to claim 2 wherein the molar ratio of said organic amide to said sulfur-containing compound is about 2:1 to about 24:1.

4. A process according to claim 3 wherein the molar ratio of said organic amide to said water is about 0.4:1 to about 1.6:1.

5. A process according to claim 4 wherein said dihaloaromatic sulfone is represented by the formula

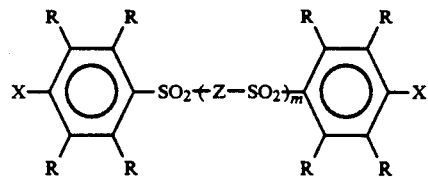

wherein each X is selected from the group consisting of fluorine, chlorine, bromine, and iodine, Z is a divalent radical selected from the group consisting of

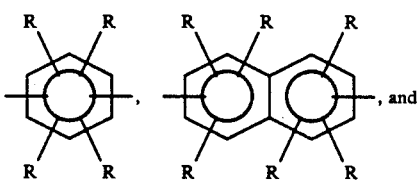, and

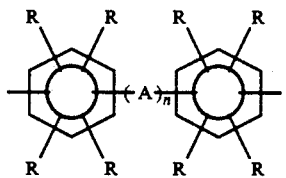

m is 0 or 1, n is 0 or 1, A is selected from the group consisting of oxygen, sulfur, sulfonyl, and CR₂, wherein each R is selected from the group consisting of hydrogen and alkyl radicals having 1 to about 4 carbon atoms, the total number of carbon atoms in all of the R groups in the molecule being 0 to about 12.

6. A process according to claim 5 wherein said organic amide is selected from the group consisting of cyclic and acyclic organic amides having 1 to about 10 carbon atoms per molecule.

7. A process according to claim 6 wherein said sulfur-containing compound is selected from the group consisting of alkali metal sulfides, alkali metal bisulfides and hydrogen sulfide.

8. A process according to claim 7 further comprising a base selected from the group consisting of alkali metal hydroxide, alkali metal carbonate, and mixtures of at least one alkali metal hydroxide with at least one alkali metal carbonate.

9. A process according to claim 8 wherein said alkali metal carboxylate is represented by the formula R'CO₂M wherein R' is a hydrocarbyl radical containing 1 to about 20 carbon atoms, and M is an alkali metal.

10. A process according to claim 9 wherein said alkali metal carboxylate is sodium acetate.

11. A process according to claim 10 wherein m is 0 and said dihaloaromatic sulfone is represented by the formula

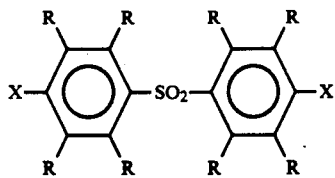

wherein each X is selected from the group consisting of fluorine, chlorine, bromine, and iodine, and each R is selected from the group consisting of hydrogen and alkyl radicals having 1 to about 4 carbon atoms, the total number of carbon atoms in all of the R groups in the molecule being 0 to about 12.

12. A process according to claim 11 wherein said poly(arylene sulfide sulfone) is poly(phenylene sulfide sulfone).

13. A process for the production of poly(phenylene sulfide sulfone) comprising contacting:
(a) bis(4-chlorophenyl)sulfone,
(b) N-methyl-2-pyrrolidone,
(c) sodium bisulfide,
(d) sodium hydroxide,
(e) water, and
(f) sodium acetate wherein the molar ratio of said sodium acetate to said sodium bisulfide is about 0.01:1 to about 0.03:1.

* * * * *